United States Patent

Sano et al.

Patent Number: 5,264,402
Date of Patent: Nov. 23, 1993

[54] NON-REDUCIBLE DIELECTRIC CERAMIC COMPOSITION

[75] Inventors: Harunobu Sano; Yukio Hamaji; Kunisaburo Tomono, all of Nagaokakyo, Japan

[73] Assignee: Murata Manufacturing Co., Ltd., Japan

[21] Appl. No.: 57,252

[22] Filed: May 3, 1993

[30] Foreign Application Priority Data

May 1, 1992 [JP] Japan ................. 4-140058

[51] Int. Cl.$^5$ ............................. C04B 35/46
[52] U.S. Cl. ..................... 501/137; 501/138; 501/139
[58] Field of Search ............ 501/137, 138, 139

[56] References Cited

U.S. PATENT DOCUMENTS

| | | | |
|---|---|---|---|
| 4,610,970 | 9/1986 | Wada et al. | 501/138 |
| 4,753,906 | 6/1988 | Nishigaki et al. | 501/139 |
| 4,781,859 | 11/1988 | Noi | 501/139 |
| 4,988,468 | 1/1991 | Nishioka et al. | 501/137 |

FOREIGN PATENT DOCUMENTS

| | | |
|---|---|---|
| 0205137 | 12/1986 | European Pat. Off. |
| 6020851 | 5/1985 | Japan |
| 0244061 | 2/1990 | Japan |
| 3045559 | 2/1991 | Japan |
| 3065557 | 3/1991 | Japan |
| 3285871 | 12/1991 | Japan |

*Primary Examiner*—Mark L. Bell
*Assistant Examiner*—Deborah Jones
*Attorney, Agent, or Firm*—Ostrolenk, Faber, Gerb & Soffen

[57] ABSTRACT

The present invention is directed to non-reducible dielectric composition consisting essentially of a main composition composed of a modified barium titanate system and additives (A) and (B) incorporated therein, said main composition consisting essentially of oxides of Ba, Ca, Ti, Zr, and Nb and having a composition represented by general formula:

$$\{(Ba_{1-x}Ca_x)O\}_m(Ti_{1-o-p}Zr_oNb_p)O_{2+p/2}$$

wherein x, o, p and m satisfy the relationships of, $0 < x \leq 0.20$
$0 < o \leq 0.25$
$0.0005 \leq p \leq 0.015$
$1.002 \leq m \leq 1.03$, and said additive (A) being composed at least one oxides selected from the group consisting of oxides of Mn, Fe, Cr, Co, and Ni, said additive (A) being incorporated into said main composition in an amount of 0.02 to 2.0 moles per 100 moles of said main composition in terms of respective oxides, $MnO_2$, $FeO_3$, $Cr_2O_3$, CoO, and NiO, said additive (B) consisting of $SiO_2$ and/or ZnO and incorporated into said main composition in an amount of 0.1 to 2.0 moles per 100 moles of said main composition. The composition is useful as material for monolithic ceramic capacitor.

1 Claim, No Drawings

NON-REDUCIBLE DIELECTRIC CERAMIC COMPOSITION

BACKGROUND OF THE INVENTION

1. Field of the Invention

This invention relates to a non-reducible dielectric ceramic composition and, more particularly, to a non-reducible dielectric ceramic composition used for a monolithic ceramic capacitor and the like.

2. Description of the Prior Art

In general, a monolithic ceramic capacitor has been fablicated by first preparing dielectric ceramic green films with a conducting ink for internal electrodes printed in the designed pattern thereon. A dielectric ceramic material, for example, such as $BaTiO_3$ system ceramic material is used for the dielectric ceramic green films. The several printed dielectric ceramic green films are stacked one on another and heat-pressed, and, finally, fired to produce monolithic ceramic capacitor units in a natural atmosphere from 1250° to 1350° C. Thus obtained monolithic ceramic capacitor units are finished by providing external electrode on end surface of the units for connecting to the internal electrodes.

Thus, the material for internal electrode is required to meet the following condition.

(a) It must not melt or evaporate at a sintering temperature of the dielectric ceramic materials.

(b) It must not oxidize or react with dielectric ceramic materials even if the sintering is carried out under oxidable atmosphere at high temperature.

As the electrode materials for internal electrode of monolithic ceramic capacitor, it is required to use a noble metal such as, for example, platinum, gold, palladium or alloy thereof.

However, these electrode materials having excellent characteristics are expensive. Therefore, the cost of the electrode material occupies from 30 to 70% of the total production cost of manufacturing monolithic ceramic capacitor.

Substitution of expensive materials for inexpensive base metals such as Ni, Fe, Co, W, Mo is known. These metals, however, are oxidized when fired at oxidizable high temperature and not usable for internal electrode. Therefore, it is required to develop a dielectric ceramic material which meets such a requirement that it is never reduced to a semiconductive material even when fired in a neutral or reducing atmosphere with base metals for internal electrode materials.

In order to satisfy this requirement, Japanese Patent Publication No. 42588/82 discloses the dielectric ceramic composition having large mole ratio of Ba site to Ti site compared with stoichiometric ratio of barium titanate solid solution. The dielectric ceramic composition has a superior characteristics even if fired in a reducing atmosphere, thus making it possible to use a base metal as material for internal electrode of monolithic ceramic capacitor.

In recent years, miniaturization of electronic components has rapidly progressed with the development in electronics and miniaturization of monolithic ceramic capacitor also become realized. A method of miniaturization of monolithic ceramic capacitor known as follows: Firstly, it is to use a material having large dielectric constant. Secondly it is to use a thin film of dielectric ceramic layer. However, the large dielectric constant material has a large grain size. Using thus large dielectric constant material, the number of grains in the dielectric film is decreased, and the reliability of monolithic ceramic capacitor is declined.

SUMMARY OF THE INVENTION

It is therefore an object of the present invention to provide a non-reducible dielectric ceramic composition which is not reduced to a semiconductive material even if fired in a reducing atmosphere.

Another object of the present invention is to provide a non-reducible dielectric ceramic composition which has a large dielectric constant in spite of a small crystal grain size.

Further, another object of the present invention is to provide a non-reducible dielectric ceramic composition which obtain a small size monolithic ceramic capacitor having large capacitance.

The present invention relates to a non-reducible dielectric ceramic composition consisting essentially of a main composition composed of a modified barium titanate system and additives (A) and (B) incorporated therein, said main composition consisting essentially of oxides of Ba, Ca, Ti, Zr, and Nb and having a composition represented by general formula:

$$\{(Ba_{1-x}Ca_x)O\}_m(Ti_{1-o-p}Zr_oNb_p)O_{2+p/2}.$$

wherein x, o, p and m satisfy the relationships of, $0 < x \leq 0.20$
$0 < o \leq 0.25$
$0.0005 \leq p \leq 0.015$
$1.002 \leq m \leq 1.03$, and said additive (A) being composed at least one oxides selected from the group consisting of oxides of Mn, Fe, Cr, Co, and Ni, said additive (A) being incorporated into said main composition in an amount of 0.02 to 2.0 moles per 100 moles of said main composition in terms of respective oxides, $MnO_2$, $Fe_2O_3$, $Cr_2O_3$, CoO and NiO, said additive (B) consisting of $SiO_2$ and/or ZnO and incorporated into said main composition in an amount of 0.1 to 2.0 moles per 100 moles of said main composition.

The non-reducible dielectric ceramic composition of the present invention is not reduced to a semiconductive material even if fired in a reducing atmosphere. When producing monolithic ceramic capacitor with the composition of the present invention, it is possible to use base metal for internal electrode and can be sintered at a relatively low temperature of not higher than 1250° C. Thus, the non-reducible dielectric ceramic composition of the present invention makes it possible to manufacture a monolithic capacitor with larger capacitance without increase in cost.

Further, the non-reducible ceramic composition of the present invention possesses a dielectric constant of not less than 9000 and small grain size of not larger than 3 um in spite of having high dielectric constant.

Accordingly, when producing monolitic ceramic capacitor with the present invention, the number of the grains presented in a dielectric ceramic layer does not decrease compared with the conventional monolithic ceramic capacitor having a large grain. Thus, the non-reducible dielectric ceramic composition of the present invention makes it possible to obtain the monolithic ceramic capacitor with larger capacitance without decrease of a high reliability.

The above and other objects, features, aspects and advantages of the present invention will become more apparent from the following detailed description of the embodiments.

DESCRIPTION OF THE PREFERRED EMBODIMENTS

As starting raw materials, there were prepared $BaCO_3$, $CaCO_3$, $TiO_2$, $ZrO_2$, $Nb_2O_5$, $MnO_2$, $Fe_2O_3$, CoO, NiO, $SiO_2$ and ZnO in purity of 99.8% or higher. These raw materials were weighed to prepare a mixture for a composition expressed by the formula:

$$\{(Ba_{1-x}Ca_x)O\}_m\text{-}(Ti_{1-o-p}Zr_oNb_p)O_{2+p/2}$$

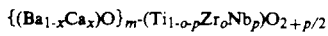

with values of x, o, p and m shown in Table 1. The resultant mixture was milled with the wet process in a ball mill, dried by evaporation and calcined in natural atmosphere at 1100° C. for 2 hours to obtain calcined powder. The calcined powder was ground by dry mill to obtain a powder having a grain size of not higher than 1 um. The ground powder was added with pure water and a vinyl acetate binder and mixed by wet process in a ball mill for 16 hours to obtain a mixture.

The mixture was dried and granulated, then the resultant powder was molded under a pressure of 2000 kg/cm$^2$ to obtain a disk with 10 mm in diameter and 0.5 mm in thickness. The molded disk was heated up to 500° C. in natural atmosphere to burn out the binder, and fired in a reducing atmosphere consisting of a $H_2$-$N_2$-air gas of $3\times10^{-8}$ to $3\times10^{-10}$ atm oxygen partial pressure at temperatures shown in Table 2 for 2 hours to obtain a sintered disk. The sintered disk was observed by a scanning-type electron microscope at 1500 magnifications to measure the grain size.

A silver paste was coated on both sides of the sintered disk and baked in $N_2$ gas at 600° C. to prepare a capacitor sample. The capacitor sample so obtained was measured for electrical characteristics of a dielectric constant ($\epsilon$) and a dielectric loss (tan$\delta$) and a temperature change rate of capacitance (TCC). The dielectric constant and dielectric loss were measured at 1 kHz, 1 $V_{rms}$ at 25° C. The temperature change rate of capacitance was determined by a change rate ($\Delta C/C_{20}$) at 25° C. and 85° C. based on the capacitance at 20° C. and a maximum change rate ($|\Delta C/C_{20}|_{max}$) in the temperature range from $-25°$ C. to 85° C. respectively.

Furthermore, an insulation resistance was measured after applying a DC voltage of 500 volts for 2 minutes at 25° C. and 85° C. respectively, and calculated the logarithms (log) of respective volume resistivities. The results were shown in Table 2.

The non-reducible dielectric ceramic composition of the system $\{(Ba_{1-x}Ca_x)O\}_m(Ti_{1-o-p}Zr_oNb_p)O_{2+p/2}$ has been limited to those having values of x, o, p and m within the above respective ranges for the following reasons:

If x of the molar fraction of Ca is zero as a Sample No. 1, a sintering property deteriorates, the dielectric loss becomes larger than 2.0% and the insulation resistance decreases. If x of the molar fraction of Ca is more than 0.20 as a Sample No. 15, a sintering property deteriorates, and dielectric constant becomes less than 9000.

If o of the molar fraction of Zr is zero as a Sample No. 2, dielectric constant becomes less than 9000 and the temperature change rate becomes larger. If o of the molar fraction of Zr is larger than 0.25 as a Sample No. 16, a sintering property deteriorates, and the dielectric constant becomes less than 9000.

If p of the molar fraction of Nb is less than 0.0005 as a Sample No. 3, dielectric constant becomes less than 9000 and the grain size becomes larger than 3 um. If p of the molar fraction of Nb is more than 0.015 as a Sample No. 17, the ceramics is reduced to be semiconductive fired in the reducing atmosphere and the insulation resistance of the ceramics becomes low.

If m of the molar ratio of the general formula is less than 1.002 as a Sample No. 4, the ceramics is reduced to be semiconductive fired in the reducing atmosphere and the insulation resistance of the ceramics becomes low. If m of the molar ratio of the general formula is higher than 1.03 as a Sample No. 18, the sintering property becomes poor. If the molar ratio of the additive components composed at least one oxides of Mn, Fe, Cr, Co, Ni is less than 0.02 as a Sample No. 5, the insulation resistance becomes lowered resulting in lowering of reliability in a long use at high temperature. If the molar ratio of the additive components composed at least one oxides of Mn, Fe, Cr, Co, Ni is more than 2 0 as a Sample No. 19, the dielectric loss becomes larger than 2.0% and the insulation resistance becomes low.

If the molar ratio of the additive components composed at least one of $SiO_2$ and ZnO is less than 0.1 as a Sample No. 6, the sintering property reliability becomes low and the dielectric loss becomes larger than 2.0%. If the molar ratio of the additive components composed at least one of $SiO_2$ and ZnO is higher than 2.0 as a Sample No. 20, the dielectric constant becomes less than 9000, the grain size becomes larger than 3 um and the insulation resistance becomes low.

According to the non-reducible dielectric ceramic composition of the present invention, a dielectric constant not less than 9000, a dielectric loss not higher than 2.0%, a temperature change rate of capacitance having E or F characteristics of Japanese Industrial Standard(-JIS) in the range from $-25°$ C. to 85° C. Furthermore, the value of insulation resistance at 25° C. and 85° C. not less than 12 which represented in logarithm of the volume resistivity. Also, the non-reducible dielectric composition of the present invention can be sintered at a temperature of not higher than 1250° C. and has a small grain size of not larger than 3 um.

In the above-mentioned embodiments, though oxide powders such as $BaCO_3$, $CaCO_3$, $TiO_2$, $ZrO_2$, $Nb_2O_5$ were used as the starting material, powders prepared by an alkoxide method, a coprecipitation method or a hydrothermal synthesis may also be used. By using these powders, it is possible to improve the characteristics than those shown in the above-mentioned embodiments.

While the present invention has been particularly described, it is to be understood that such description is used merely as an example rather than limitation, and the spirit and scope of the present invention is determined solely by the terms of the appended claim.

TABLE 1

| SAMPLE No. | MAIN COMPOSITION $\{(Ba_{1-x}Ca_x)O\}_m(Ti_{1-o-p}Zr_oNb_p)O_{2+p/2}$ | | | | ADDITIVE (A) (mol) | | | | | ADDITIVE (B) (mol) | |
|---|---|---|---|---|---|---|---|---|---|---|---|
| | x | m | o | p | $MnO_2$ | $Fe_2O_3$ | $Cr_2O_3$ | CoO | NiO | $SiO_2$ | ZnO |
| *1 | 0 | 1.005 | 0.15 | 0.01 | 0.3 | — | — | — | — | 0.5 | 0.2 |
| *2 | 0.10 | 1.005 | 0 | 0.01 | 0.3 | — | — | — | — | 0.5 | 0.2 |
| *3 | 0.12 | 1.01 | 0.17 | 0 | 0.3 | — | — | — | — | 0.5 | 0.2 |
| *4 | 0.05 | 0.995 | 0.13 | 0.01 | 0.3 | — | — | — | — | 0.5 | 0.2 |
| *5 | 0.05 | 1.01 | 0.13 | 0.01 | — | — | — | — | — | 0.5 | 0.4 |
| *6 | 0.10 | 1.01 | 0.10 | 0.01 | 0.3 | — | — | — | — | — | — |
| 7 | 0.01 | 1.03 | 0.16 | 0.01 | 0.5 | — | 0.1 | — | — | 1.0 | 1.0 |
| 8 | 0.05 | 1.015 | 0.20 | 0.005 | 0.3 | — | — | — | — | — | 0.6 |
| 9 | 0.12 | 1.01 | 0.13 | 0.005 | 0.3 | — | — | — | 0.1 | 0.4 | 0.3 |
| 10 | 0.20 | 1.002 | 0.01 | 0.015 | 1.0 | 0.1 | 0.2 | 0.4 | 0.3 | 0.1 | — |
| 11 | 0.10 | 1.01 | 0.17 | 0.0075 | 0.2 | — | — | 0.1 | 0.1 | 0.5 | 0.2 |
| 12 | 0.02 | 1.01 | 0.25 | 0.0005 | 0.02 | — | — | — | — | 0.7 | 0.2 |
| 13 | 0.03 | 1.01 | 0.15 | 0.01 | 0.5 | — | — | — | — | 0.4 | 0.4 |
| 14 | 0.07 | 1.01 | 0.10 | 0.012 | 0.4 | 0.1 | — | — | — | 1.0 | — |
| *15 | 0.25 | 1.005 | 0.15 | 0.01 | 0.3 | — | — | — | — | 0.5 | 0.2 |
| *16 | 0.10 | 1.005 | 0.30 | 0.01 | 0.3 | — | — | — | — | 0.5 | 0.2 |
| *17 | 0.05 | 1.01 | 0.12 | 0.02 | 0.3 | — | — | — | — | 0.5 | 0.2 |
| *18 | 0.05 | 1.04 | 0.13 | 0.01 | 0.3 | — | — | — | — | 0.5 | 0.2 |
| *19 | 0.05 | 1.01 | 0.13 | 0.01 | 3.0 | — | — | — | — | 0.5 | 0.2 |
| *20 | 0.10 | 1.01 | 0.10 | 0.01 | 0.3 | — | — | — | — | 2.0 | 2.0 |

*indicates out of the scope of the invention

TABLE 2

| SAMPLE No. | FIRING TEMPERATURE (°C.) | DIELECTRIC CONSTANT ε | DIELECTRIC LOSS tan δ | TCC (%) $\Delta C/C_{20}$ | | $\|\Delta C/C_{20}\|$ max | VOLUME RESISTANCE log ρ (Ω·cm) | | GRAIN SIZE (μm) |
|---|---|---|---|---|---|---|---|---|---|
| | | | | −25° C. | 85° C. | | 25° C. | 85° C. | |
| *1 | 1300 | 16200 | 3.3 | −75 | −53 | 75 | 12.0 | 8.9 | 3.0 |
| *2 | 1250 | 6100 | 2.0 | −70 | −10 | 200 | 13.0 | 12.2 | 2.0 |
| *3 | 1250 | 8000 | 0.9 | −47 | −51 | 51 | 13.1 | 12.4 | 4.5 |
| *4 | 1220 | | | unmeasurable | | | | | 1.5 |
| *5 | 1250 | 16500 | 1.3 | −75 | −71 | 75 | 12.5 | 8.3 | 2.0 |
| *6 | 1320 | 10700 | 2.6 | −54 | −50 | 54 | 13.3 | 12.0 | 2.0 |
| 7 | 1170 | 13500 | 0.7 | −71 | −72 | 72 | 13.7 | 12.8 | 2.0 |
| 8 | 1220 | 14100 | 0.8 | −72 | −74 | 74 | 13.5 | 13.0 | 2.5 |
| 9 | 1220 | 9500 | 0.9 | −48 | −52 | 52 | 13.7 | 13.1 | 3.0 |
| 10 | 1250 | 12200 | 1.5 | −63 | −74 | 74 | 13.0 | 12.0 | 2.5 |
| 11 | 1220 | 11500 | 0.7 | −50 | −54 | 54 | 13.3 | 12.5 | 2.5 |
| 12 | 1250 | 13000 | 1.0 | −72 | −68 | 72 | 13.5 | 13.0 | 3.0 |
| 13 | 1220 | 17500 | 0.8 | −71 | −76 | 76 | 13.2 | 13.0 | 2.5 |
| 14 | 1200 | 13200 | 0.6 | −67 | −71 | 71 | 13.3 | 12.8 | 2.0 |
| *15 | 1350 | 5500 | 0.1 | −30 | −54 | 54 | 13.3 | 12.5 | 3.0 |
| *16 | 1350 | 5800 | 0.05 | 10 | −60 | 60 | 13.5 | 12.3 | 3.0 |
| *17 | 1250 | | | unmeasurable | | | | | 2.0 |
| *18 | | | | not sintered enough | | | | | |
| *19 | 1220 | 18100 | 2.8 | −73 | −77 | 77 | 11.6 | 8.1 | 3.0 |
| *20 | 1250 | 7900 | 1.4 | −47 | −52 | 52 | 11.9 | 10.7 | 4.0 |

*indicates out of the scope of the invention

What is claimed is:

1. A non-reducible dielectric ceramic composition consisting essentially of a main composition composed of a modified barium titanate system and additives (A) and (B) incorporated therein, said main composition consisting essentially of oxides of Ba, Ca, Ti, Zr, and Nb and having a composition represented by general formula:

$$\{(Ba_{1-x}Ca_x)O\}_m(Ti_{1-o-p}Zr_oNb_p)O_{2+p/2}$$

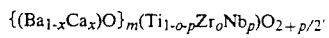

wherein x, o, p and m satisfy the relationships of, $0 < x \leq 0.20$
$0 < o \leq 0.25$
$0.0005 \leq p \leq 0.015$
$1.002 \leq m \leq 1.03$, and said additive (A) being composed at least one oxides selected from the group consisting of oxides of Mn, Fe, Cr, Co, and Ni, said additive (A) being incorporated into said main composition in an amount of 0.02 to 2.0 moles per 100 moles of said main composition in terms of respective oxides, $MnO_2$, $Fe_2O_3$, $Cr_2O_3$, CoO and NiO, said additive (B) consisting of $SiO_2$ and/or ZnO and incorporated into said main composition in an amount of 0.1 to 2.0 moles per 100 mols of said main composition.

* * * * *